US 6,569,991 B2

United States Patent
Nichols et al.

(10) Patent No.: US 6,569,991 B2
(45) Date of Patent: *May 27, 2003

(54) METHODS OF POST-POLYMERIZATION EXTRUDER INJECTION IN POLYETHYLENE TEREPHTHALATE PRODUCTION

(75) Inventors: Carl Steven Nichols, Waxhaw, NC (US); Tony Clifford Moore, Charlotte, NC (US); Robert Joseph Schiavone, Matthews, NC (US); Walter Lee Edwards, Harrisburg, NC (US)

(73) Assignee: Wellman, Inc., Shrewsbury, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/932,150

(22) Filed: Aug. 17, 2001

(65) Prior Publication Data

US 2002/0091226 A1 Jul. 11, 2002

Related U.S. Application Data

(63) Continuation-in-part of application No. 09/738,150, filed on Dec. 15, 2000.

(51) Int. Cl.[7] ................................................. C08F 6/00
(52) U.S. Cl. .................... 528/491; 528/272; 528/486; 528/487; 528/489; 528/503; 525/437; 524/81; 524/115; 428/36.3; 428/364; 428/35.7; 264/176.1; 264/209.1; 264/464
(58) Field of Search ........................ 528/272, 486, 528/487, 489, 491, 503; 525/437; 524/81, 115; 428/35.7, 36.3, 364; 264/176.1, 209.1, 464; 526/65, 66

(56) References Cited

U.S. PATENT DOCUMENTS

| 4,132,707 A | 1/1979 | Borman |
| 4,224,264 A | 9/1980 | Ort et al. |
| 4,312,960 A | 1/1982 | Ort et al. |
| 4,365,031 A | 12/1982 | Massey et al. |
| 4,374,949 A | 2/1983 | Massey et al. |
| 4,443,573 A | 4/1984 | Wells et al. |
| 4,643,925 A | 2/1987 | Smith et al. |
| 4,654,399 A | 3/1987 | Callander et al. |

(List continued on next page.)

FOREIGN PATENT DOCUMENTS

| EP | 0 169 085 A1 | 1/1986 |
| EP | 0 272 417 A2 | 6/1988 |
| EP | 0 466 370 A2 | 11/1991 |
| EP | 0 703 263 A1 | 3/1996 |
| EP | 0 718 341 A2 | 6/1996 |
| JP | 61-250034 | 11/1986 |
| JP | 03039348 A | 2/1991 |
| JP | 08120066 A | 5/1996 |
| JP | 11323126 A | 11/1999 |
| WO | WO 99/41297 A | 8/1999 |
| WO | WO 00/12793 A | 3/2000 |
| WO | WO 00/66659 A | 11/2000 |
| WO | WO 02/16464 A2 | 2/2002 |

Primary Examiner—Samuel A. Acquah
(74) Attorney, Agent, or Firm—Summa & Allan, P.A.

(57) ABSTRACT

The invention is a novel method for the late introduction of additives into polyethylene terephthalate. The method employs a reactive carrier that functions as a delivery vehicle for one or more additives. The reactive carrier reacts with the polyethylene terephthalate, thereby binding the reactive carrier in the polyethylene terephthalate resin and preventing the emergence of the reactive carrier and additives from the polyethylene terephthalate during subsequent thermal processing.

58 Claims, 2 Drawing Sheets

U.S. PATENT DOCUMENTS

| | | |
|---|---|---|
| 4,778,858 A | 10/1988 | Ginnings |
| 4,786,673 A | 11/1988 | Morival et al. |
| 4,898,897 A | 2/1990 | Kiyohara et al. |
| 5,008,230 A | 4/1991 | Nichols |
| 5,240,980 A | 8/1993 | Danielson et al. |
| 5,262,471 A | 11/1993 | Akao |
| 5,308,892 A | 5/1994 | Zickler et al. |
| 5,376,702 A | 12/1994 | Stibal et al. |
| 5,574,078 A | 11/1996 | Elwakil |
| 5,712,362 A | 1/1998 | Scholl et al. |
| 5,834,089 A | 11/1998 | Jones et al. |
| 5,874,517 A | 2/1999 | Huang et al. |
| 5,898,058 A | 4/1999 | Nichols et al. |
| 5,919,872 A | 7/1999 | Tung et al. |
| 5,922,828 A | 7/1999 | Schiraldi |
| 5,939,516 A | 8/1999 | Greaves et al. |
| 5,945,460 A | 8/1999 | Ekart et al. |
| 5,976,450 A | 11/1999 | Mreijen |
| 6,048,922 A | 4/2000 | Brink et al. |
| 6,110,405 A | 8/2000 | King et al. |
| 6,121,351 A | 9/2000 | Weaver et al. |
| 6,150,454 A | 11/2000 | Wu et al. |
| 6,284,866 B1 | 9/2001 | Schiavone |
| 6,423,764 B1 | 7/2002 | Zhao et al. |
| 2002/0077449 A1 | 6/2002 | Nichols et al. |
| 2002/0091226 A1 | 7/2002 | Nichols et al. |
| 2002/0128427 A1 | 9/2002 | Schaat et al. |

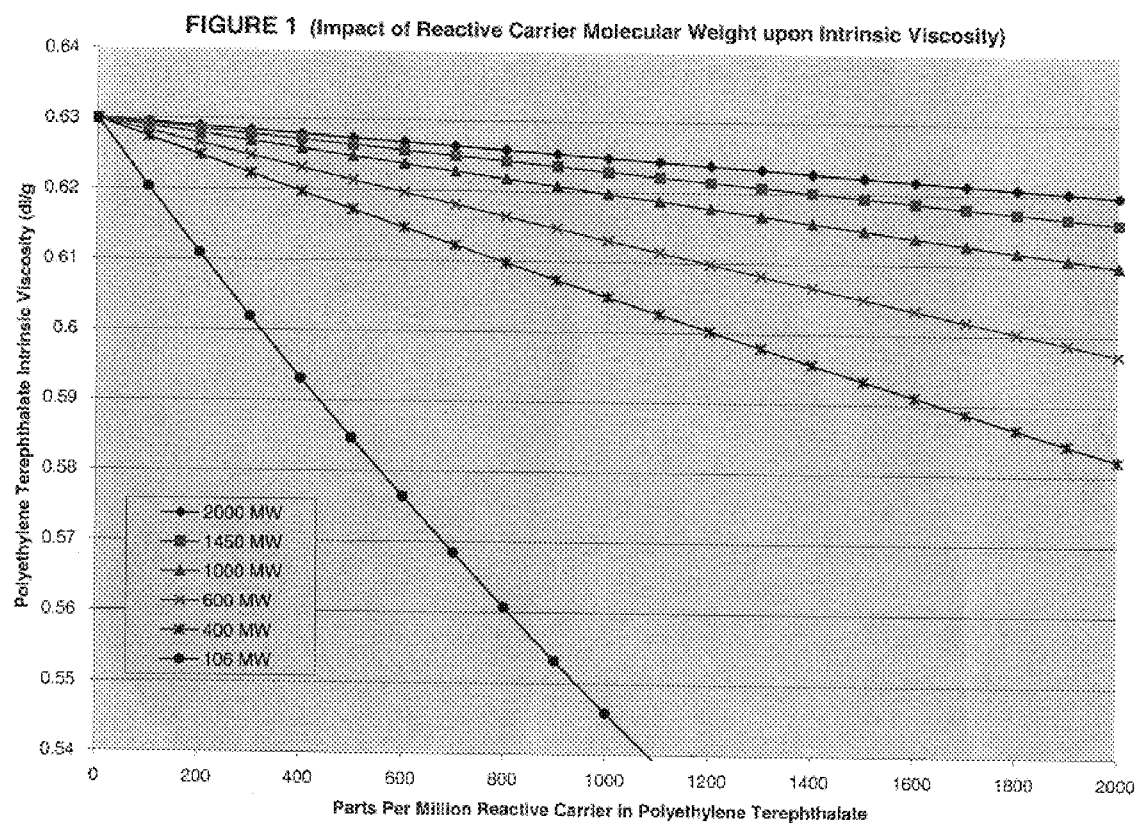

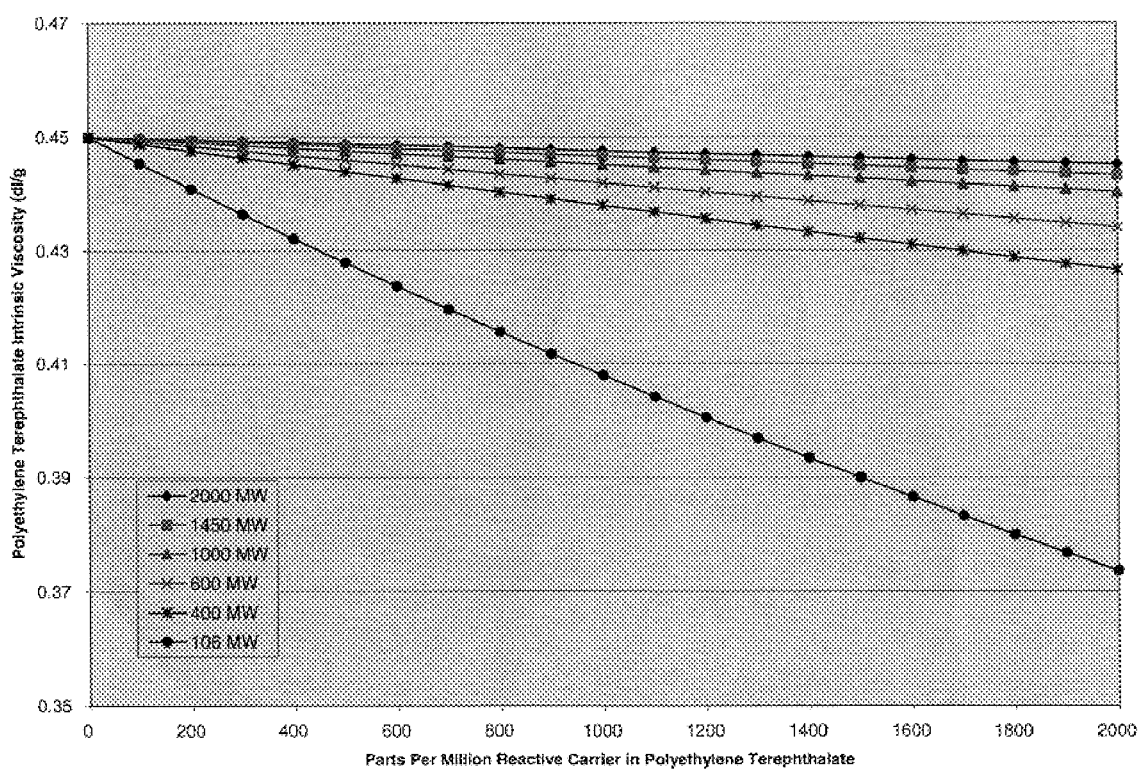

METHODS OF POST-POLYMERIZATION EXTRUDER INJECTION IN POLYETHYLENE TEREPHTHALATE PRODUCTION

CROSS-REFERENCE TO RELATED APPLICATION

This application is a continuation-in-part of copending and commonly-assigned U.S. application Ser. No. 09/738,150, for Methods of Post-Polymerization Injection in Continuous Polyethylene Terephthalate Production, which was filed Dec. 15, 2000, and which is herein incorporated by reference in its entirety.

FIELD OF THE INVENTION

The present invention relates to the production of polyethylene terephthalate polyester. More particularly, the present invention relates to the late introduction of additives into polyethylene terephthalate via reactive carriers.

BACKGROUND OF THE INVENTION

Because of their strength, heat resistance, and chemical resistance, polyester fibers and films are an integral component in numerous consumer products manufactured worldwide. Most commercial polyester used for polyester fibers and films is polyethylene terephthalate (PET) polyester. Because polyethylene terephthalate forms a lightweight and shatterproof product, another popular use for polyethylene terephthalate is as a resin for containers, especially beverage bottles.

Before 1965, the only feasible method of producing polyethylene terephthalate polyester was to use dimethyl terephthalate (DMT). In this technique, dimethyl terephthalate and ethylene glycol are reacted in a catalyzed ester interchange reaction to form bis(2-hydroxyethyl) terephthalate monomers and oligomers, as well as a methanol byproduct that is continuously removed. These bis(2-hydroxyethyl) terephthalate monomers and oligomers are then polymerized via polycondensation to produce polyethylene terephthalate polymers.

Purer forms of terephthalic acid (TA) are now increasingly available. Consequently, terephthalic acid has become an acceptable, if not preferred, alternative to dimethyl terephthalate as a starting material for the production of polyethylene terephthalate. In this alternative technique, terephthalic acid and ethylene glycol react in a generally uncatalyzed esterification reaction to yield low molecular weight monomers and oligomers, as well as a water byproduct that is continuously removed. As with the dimethyl terephthalate technique, the monomers and oligomers are subsequently polymerized by polycondensation to form polyethylene terephthalate polyester. The resulting polyethylene terephthalate polymer is substantially identical to the polyethylene terephthalate polymer resulting from dimethyl terephthalate, albeit with some end group differences.

Polyethylene terephthalate polyester may be produced in a batch process, where the product of the ester interchange or esterification reaction is formed in one vessel and then transferred to a second vessel for polymerization. Generally, the second vessel is agitated and the polymerization reaction is continued until the power used by the agitator reaches a level indicating that the polyester melt has achieved the desired intrinsic viscosity and, thus, the desired molecular weight. More commercially practicable, however, is to carry out the esterification or ester interchange reactions, and then the polymerization reaction as a continuous process. The continuous production of polyethylene terephthalate results in greater throughput, and so is more typical in large-scale manufacturing facilities.

When the polymerization process is complete, the resulting polymer melt is typically extruded and pelletized for convenient storage and transportation before being transformed into specific polyester articles (e.g., filament, films, or bottles). The latter kinds of steps are herein referred to as "polyester processing."

In both batch and continuous processes, a high activity catalyst is often employed to increase the rate of polymerization, thereby increasing the throughput of the resulting polyethylene terephthalate polyester. The high activity catalysts that are used in the polymerization of polyethylene terephthalate polyester can be basic, acidic, or neutral, and are often metal catalysts.

Primarily, the traditional polymerization catalysts used in the formation of polyethylene terephthalate from both terephthalic acid and dimethyl terephthalate contain antimony, most commonly antimony trioxide ($Sb_2O_3$). Although increasing production rates, polymerization catalysts like antimony trioxide will eventually begin to catalyze or encourage the degradation of the polyethylene terephthalate polymer. Such polymer degradation results in the formation of acetaldehyde, the discoloration (e.g., yellowing) of the polyethylene terephthalate polyester, and reduction of polymer molecular weight.

Furthermore, the recent availability of "hotter" catalysts that can significantly increase throughput has generated a corresponding need for better stabilization of the resulting polyester. U.S. Pat. No. 5,008,230 for a Catalyst for Preparing High Clarity, Colorless Polyethylene Terephthalate is exemplary of such an improved catalyst. To reduce the degradation and discoloration of polyethylene terephthalate polyester, stabilizing compounds are used to sequester ("cool") the catalyst, thereby reducing its effectiveness. The most commonly used stabilizers contain phosphorous, typically in the form of phosphates and phosphites. The phosphorous-containing stabilizers were first employed in batch processes to prevent degradation and discoloration of the polyethylene terephthalate polyester.

Although adding a stabilizer to the polymer melt in a batch reactor is a relatively simple process, numerous problems arise if the stabilizers are added in the continuous production of polyethylene terephthalate. For example, while early addition of the stabilizer prevents discoloration and degradation of the polyester, it also causes reduced production throughput (i.e., decreases polycondensation reaction rates). Moreover, such stabilizer is typically dissolved in ethylene glycol, the addition of which further slows the polymerization process. Consequently, early addition of the stabilizer in the polymerization process requires an undesirable choice between production throughput and thermal stability of the polymer. As used herein, "thermal stability" refers to a low rate of acetaldehyde generation, low discoloration, and retention of molecular weight following subsequent heat treatment or other processing.

Late addition of the stabilizer (e.g., after the polymerization process during polymer processing) may provide insufficient opportunity for the stabilizer to fully blend with the polymer. Consequently, the stabilizer may not prevent degradation and discoloration of the polyester. In addition, adding stabilizer during polymer processing is inconvenient and does not provide economies of scale.

U.S. Pat. No. 5,376,702 for a Process and Apparatus for the Direct and Continuous Modification of Polymer Melts discloses dividing a polymer melt stream into an unmodified stream and a branch stream that receives additives. In particular, a side stream takes a portion of the branch stream to an extruder, where additives are introduced. Such techniques, however, are not only complicated, but also costly, requiring a screw extruder and melt piping to process additives. Consequently, such arrangements are inconvenient and even impractical where total additive concentrations are low (e.g., less than one weight percent).

Certain problems associated with late addition of stabilizer are addressed in U.S. Pat. No. 5,898,058 for a Method of Post-Polymerization Stabilization of High Activity Catalysts in Continuous Polyethylene Terephthalate Production, which discloses a method of stabilizing high activity polymerization catalysts in continuous polyethylene terephthalate production. This patent, which is commonly assigned with this application, is hereby incorporated entirely herein by reference.

In particular, U.S. Pat. No. 5,898,058 discloses adding a stabilizer, which preferably contains phosphorous, at or after the end of the polymerization reaction and before polymer processing. This deactivates the polymerization catalyst and increases the throughput of the polyester without adversely affecting the thermal stability of the polyethylene terephthalate polyester. While a noteworthy improvement over conventional techniques, U.S. Pat. No. 5,898,058 teaches adding the stabilizer without a carrier. Consequently, the addition of solids into the polymer necessitates the costly use of an extruder.

U.S. parent application Ser. No. 09/738,150 for Methods of Post-Polymerization Injection in Continuous Polyethylene Terephthalate Production, discloses a continuous process for the production of high quality polyethylene terephthalate polyester that improves upon the stabilizer-addition techniques disclosed by commonly-assigned U.S. Pat. No. 5,898,058.

More specifically, U.S. application Ser. No. 09/738,150 discloses a method for the late introduction of additives into a continuous process for making polyethylene terephthalate. The additives are introduced during, and preferably after, the polycondensation of polyethylene terephthalate polymers. In particular, the method employs a reactive carrier that not only functions as a delivery vehicle for one or more additives, but also reacts with the polyethylene terephthalate, thereby binding the carrier in the polyethylene terephthalate resin. Moreover, U.S. application Ser. No. 09/738,150 discloses that this may be achieved using a simplified additive delivery system that does not require the use of an extruder.

The technology of U.S. application Ser. No. 09/738,150 is effectively employed in co-pending and commonly-assigned application U.S. Ser. No. 09/738,619 for Polyester Bottle Resins Having Reduced Frictional Properties and Methods for Making the Same, which was also filed Dec. 15, 2000, and which is herein incorporated by reference in its entirety. U.S. application Ser. No. 09/738,619, in certain preferred embodiments, likewise employs a simplified additive delivery system that does not require the use of an extruder.

Despite the preference to exclude an extruder from additive delivery systems, there are circumstances where using an extruder is advantageous. For example, introducing additives at an extruder facilitates quick formulation changes. Moreover, while introducing additives at an extruder may hinder productivity at larger-scale operations, it may be appropriate for smaller-scale operations.

Therefore, there is a need for a post-polymerization injection technique that ensures that the late addition of additives during polyethylene terephthalate processes will yield a polyethylene terephthalate polymer whose additives and carriers are integral parts of the polymer resin, while retaining the conveniences associated with extruder addition.

OBJECT AND SUMMARY OF THE INVENTION

Accordingly, it is an object of the present invention to provide a method of adding additives to polyethylene terephthalate at an extruder via a reactive carrier.

It is a further object of the present invention to provide a method of adding additives to polyethylene terephthalate via a reactive carrier in a way that permits quick formulation changes.

It is a further object of the present invention to provide a method of adding additives to polyethylene terephthalate via a reactive carrier in order to reduce polymer transition times and eliminate process upsets resulting from changing polymer formulations.

It is a further object of the present invention to provide a method of introducing additives into polyethylene terephthalate in a way that reduces the degradation or volatilization of such additives.

The foregoing, as well as other objectives and advantages of the invention and the manner in which the same are accomplished, is further specified within the following detailed description and its accompanying drawings.

BRIEF DESCRIPTION OF THE DRAWING

FIG. 1 illustrates the theoretical loss of intrinsic viscosity of polyethylene terephthalate having an intrinsic viscosity of 0.63 dl/g as a function of the concentration of the reactive carrier at various molecular weights.

FIG. 2 illustrates the theoretical loss of intrinsic viscosity of polyethylene terephthalate having an intrinsic viscosity of 0.45 dl/g as a function of the concentration of the reactive carrier at various molecular weights.

DETAILED DESCRIPTION

The invention is a novel method for late additive introduction at an extruder during a process for making polyethylene terephthalate. As noted previously, the method employs a reactive carrier that not only functions as a delivery vehicle for one or more additives, but also reacts with the polyethylene terephthalate to bind the carrier in the polyethylene terephthalate resin. This prevents the emergence of the carrier from the polyethylene terephthalate during subsequent processing, such as solid state polymerization, drying operations, and injection molding operations. This also improves dispersion of the additive in the polymer and reduces the tendency of the additive to emerge and deposit in polymer processing equipment during solid state polymerization.

In one aspect, the present invention includes combining at an extruder polyethylene terephthalate polymers and a reactive carrier having a molecular weight of less than about 10,000 g/mol and being the delivery vehicle for one or more additives.

As used herein, the concept of combining (or introducing, adding, etc.) the polyethylene terephthalate polymers and the reactive carrier at an extruder embraces (1) introducing both the polyethylene terephthalate polymers and the reactive carrier into the extruder; (2) introducing the reactive carrier into the polyethylene terephthalate polymers before the extruder, and then mixing the polyethylene terephthalate polymers and the reactive carrier within the extruder; and (3) introducing the reactive carrier into the polyethylene terephthalate polymers after the extruder.

In another aspect, the present invention includes reacting a terephthalate component and a diol component to form polyethylene terephthalate precursors, e.g., bis(2-hydroxyethyl)terephthalate, which are then polymerized via melt phase polycondensation to form polymers of polyethylene terephthalate. During polycondensation, which is usually enhanced by catalysts, ethylene glycol is continuously removed to create favorable reaction kinetics. Thereafter, one or more additives are then introduced by way of a reactive carrier into the polyethylene terephthalate polymers (i.e., the reactive carrier functions as an additive delivery vehicle).

In a particular embodiment of the invention, the polyethylene terephthalate polymers may be pelletized, and thereafter the polyethylene terephthalate polymers and the reactive carrier are introduced at—preferably into—an extruder. The reactive carrier, which has a molecular weight of less than about 10,000 g/mol, not only facilitates uniform blending of the additives within the polymer melt, but also reacts with the polyethylene terephthalate polymers to ensure that the carrier does not emerge during subsequent processes.

As used herein, the term "intrinsic viscosity" is the ratio of the specific viscosity of a polymer solution of known concentration to the concentration of solute, extrapolated to zero concentration. Intrinsic viscosity, which is widely recognized as standard measurements of polymer characteristics, is directly proportional to average polymer molecular weight. See, e.g., Dictionary of Fiber and Textile Technology, Hoechst Celanese Corporation (1990); Tortora & Merkel, Fairchild's Dictionary of Textiles (7$^{th}$ Edition 1996).

Intrinsic viscosity can be measured and determined without undue experimentation by those of ordinary skill in this art. For the intrinsic viscosity values described herein, the intrinsic viscosity is determined by dissolving the copolyester in orthochlorophenol (OCP), measuring the relative viscosity of the solution using a Schott Autoviscometer (AVS Schott and AVS 500 Viscosystem), and then calculating the intrinsic viscosity based on the relative viscosity. See, e.g., Dictionary of Fiber and Textile Technology ("intrinsic viscosity").

In particular, a 0.6-gram sample (+/−0.005 g) of dried polymer sample is dissolved in about 50 ml (61.0 −63.5 grams) of orthochlorophenol at a temperature of about 105° C. Fiber and yarn samples are typically cut into small pieces, whereas chip samples are ground. After cooling to room temperature, the solution is placed in the viscometer at a controlled, constant temperature, (e.g., between about 20° and 25° C.), and the relative viscosity is measured. As noted, intrinsic viscosity is calculated from relative viscosity.

As used herein, the term "diol component" refers primarily to ethylene glycol, although other diols (e.g., low molecular weight polyethylene glycol) may be used as well. It will be understood by those of ordinary skill in the art that the diol component usually forms the majority of terminal ends of the polymer chains and so is present in the composition in slightly greater fractions. For example, the molar ratio of the terephthalate component and the diol component is typically between about 1.0:1.0 and 1.0:1.6.

As used herein, the term "terephthalate component" refers to diacids and diesters that can be used to prepare polyethylene terephthalate. In particular, the terephthalate component mostly includes terephthalic acid and dimethyl terephthalate, but can include diacid and diester comonomers as well. In this regard, those having ordinary skill in the art will know that there are two conventional methods for forming polyethylene terephthalate. These methods are well known to those skilled in the art.

One method employs a direct esterification reaction using terephthalic acid and excess ethylene glycol. In this technique, the aforementioned step of reacting a terephthalate component and a diol component includes reacting terephthalic acid and ethylene glycol in a heated esterification reaction to form monomers and oligomers of terephthalic acid and ethylene glycol, as well as a water byproduct. To enable the esterification reaction to go essentially to completion, the water must be continuously removed as it is formed.

The other method involves a two-step ester exchange reaction and polymerization using dimethyl terephthalate and excess ethylene glycol. In this technique, the aforementioned step of reacting a terephthalate component and a diol component includes reacting dimethyl terephthalate and ethylene glycol in a heated ester exchange reaction to form monomers and oligomers of terephthalate and ethylene glycol, as well as methanol as a byproduct. To enable the ester exchange reaction to go essentially to completion, the methanol must be continuously removed as it is formed.

It will be understood by those having ordinary skill in the art that the polyethylene terephthalate herein described may be a modified polyethylene terephthalate to the extent the diol component includes other glycols besides ethylene glycol, such as diethylene glycol, 1,3-propanediol, 1,4-butanediol and 1,4-cyclohexane dimethanol, or the terephthalate component includes modifiers such as isophthalic acid, 2,6-naphthalene dicarboxylic acid, succinic acid, or one or more functional derivatives of terephthalic acid. In fact, most commercial polyethylene terephthalate polymers are modified polyethylene terephthalate polyesters.

In the present invention, the direct esterification reaction is preferred over the older, two-step ester exchange reaction. As noted, the direct esterification technique reacts terephthalic acid and ethylene glycol to form low molecular weight monomers, oligomers, and water.

For example, in a typical exemplary process, the continuous feed enters a direct esterification vessel that is operated at a temperature of between about 240° C. and 290° C. and at a pressure of between about 5 and 85 psia for between about one and five hours. The reaction, which is typically uncatalyzed, forms low molecular weight monomers, oligomers, and water. The water is removed as the esterification reaction proceeds and excess ethylene glycol is removed to provide favorable reaction kinetics.

Thereafter, the low molecular weight monomers and oligomers are polymerized via polycondensation to form polyethylene terephthalate polyester. This polycondensation stage generally employs a series of two or more vessels and is operated at a temperature of between about 250° C. and 305° C. for between about one and four hours. The polycondensation reaction usually begins in a first vessel called the low polymerizer. The low polymerizer is operated at a pressure range of between about 0 and 70 torr. The monomers and oligomers polycondense to form polyethylene terephthalate and ethylene glycol.

As noted previously, the ethylene glycol is removed from the polymer melt using an applied vacuum to drive the reaction to completion. In this regard, the polymer melt is typically agitated to promote the escape of the ethylene glycol from the polymer melt and to assist the highly viscous polymer melt in moving through the polymerization vessel.

As the polymer melt is fed into successive vessels, the molecular weight and thus the intrinsic viscosity of the polymer melt increases. The temperature of each vessel is generally increased and the pressure decreased to allow greater polymerization in each successive vessel.

The final vessel, generally called the "high polymerizer," is operated at a pressure of between about 0 and 40 torr. Like the low polymerizer, each of the polymerization vessels is connected to a flash vessel and each is typically agitated to facilitate the removal of ethylene glycol. The residence time in the polymerization vessels and the feed rate of the ethylene glycol and terephthalic acid into the continuous process is determined in part based on the target molecular weight of the polyethylene terephthalate polyester. Because the molecular weight can be readily determined based on the intrinsic viscosity of the polymer melt, the intrinsic viscosity of the polymer melt is generally used to determine polymerization conditions, such as temperature, pressure, the feed rate of the reactants, and the residence time within the polymerization vessels.

Note that in addition to the formation of polyethylene terephthalate polymers, side reactions occur that produce undesirable by-products. For example, the esterification of ethylene glycol forms diethylene glycol (DEG), which is incorporated into the polymer chain. As is known to those of skill in the art, diethylene glycol lowers the softening point of the polymer. Moreover, cyclic oligomers (e.g., trimer and tetramers of terephthalic acid and ethylene glycol) may occur in minor amounts. The continued removal of ethylene glycol as it forms in the polycondensation reaction will generally reduce the formation of these by-products.

After the polymer melt exits the polycondensation stage, typically from the high polymerizer, it is generally filtered and extruded into polyester sheets, filaments, or pellets. Preferably, the polymer melt is extruded immediately after exiting the polycondensation stage. After extrusion, the polyethylene terephthalate is quenched, preferably by spraying with water or immersing in a water trough, to solidify it. The solidified polyethylene terephthalate polyester is cut into chips or pellets for storage and handling purposes. As used herein, the term "pellets" is used generally to refer to chips, pellets, and the like.

As will be known to those of skill in the art, the pellets formed from the polyethylene terephthalate polymers may be subjected to crystallization followed by solid state polymerization (SSP) to increase the molecular weight of the polyethylene terephthalate resin. Solid state polymerization can be initiated either before or after introducing the reactive carrier. It should be noted that the inclusion of the reactive carrier does not adversely affect the SSP rate and often will even increase the SSP rate. Thereafter, polyester chips are then re-melted and re-extruded to form items such as containers (e.g., beverage bottles), filaments, films, or other applications.

The present invention improves upon the prior art by employing a reactive carrier rather than an inert carrier or no carrier at all. The reactive carrier should be introduced to the polyethylene terephthalate polymers in quantities such that bulk polymer properties are not significantly affected.

Accordingly, in a preferred embodiment, the invention includes introducing to an extruder polyethylene terephthalate polymers and a reactive carrier that is the delivery vehicle for one or more additives. Moreover, the reactive carrier, which has an average molecular weight of less than about 10,000 g/mol, is introduced into the extruder in quantities such that bulk polymer properties of the polyethylene terephthalate polymers are not significantly affected.

As used herein, the concept of introducing to an extruder polyethylene terephthalate polymers and a reactive carrier embraces (1) introducing both the polyethylene terephthalate polymers and the reactive carrier into the extruder; and (2) introducing the reactive carrier into the polyethylene terephthalate polymers before the extruder, and then mixing the polyethylene terephthalate polymers and the reactive carrier within the extruder.

Most preferably, the reactive carrier has a melting point that ensures that it is a liquid or slurry at near ambient temperatures. As used herein, the term "near ambient" includes temperatures between about 20° C. and 60° C. Near ambient temperatures simplify the unit operations necessary to introduce additives as complicated heating systems are not needed to introduce the reactive carrier into the polyethylene terephthalate polymers.

Because an extruder is employed in the present invention, the polyethylene terephthalate polymers are preferably solid (i.e., polymer chips or pellets) when combined with the reactive carrier at the extruder (e.g., introduced into the extruder).

Likewise, the reactive carrier can be a solid when combined with the polyethylene terephthalate polymers at the extruder. In this regard, a solid reactive carrier is preferably introduced into the extruder toward the back of the extruder as this promotes melting and mixing (and reacting) of the polyethylene terephthalate polymers and the reactive carrier.

Preferably, however, the reactive carrier is a liquid or slurry when combined with the polyethylene terephthalate polymers at the extruder. A liquid or slurried reactive carrier can be introduced into the back or front of the extruder. As noted, most preferably, the reactive carrier is a liquid or slurry at near ambient temperatures.

As a general matter, the reactive carrier should make up no more than about one weight percent of the polyethylene terephthalate resin. Preferably, the reactive carrier is introduced to the polyethylene terephthalate polymers in quantities such that its concentration in the polymer resin is less than about 1000 ppm (i.e., 0.1 weight percent). Reducing the reactive carrier to quantities such that its concentration in the polymer resin is less than 500 ppm (i.e., 0.05 weight percent) will further reduce potential adverse effects to bulk polymer properties.

FIGS. 1 and 2 illustrate the theoretical loss of intrinsic viscosity as a function of reactive carrier concentration at several molecular weights. FIG. 1 depicts the impact of the reactive carrier upon polyethylene terephthalate having an intrinsic viscosity of 0.63 dl/g. Similarly, FIG. 2 depicts the impact of the reactive carrier on upon polyethylene terephthalate having intrinsic viscosity of 0.45 dl/g. Note that at any concentration, the reactive carriers having higher molecular weights have less adverse effect upon intrinsic viscosity of the polymer resin.

As will be understood by those of ordinary skill in the art, macromolecules are considered to be polymers at an intrinsic viscosity of about 0.45 dl/g. At an intrinsic viscosity of at least about 0.45 dl/g, which roughly translates to a molecular weight of at least about 13,000 g/mol, the polyethylene terephthalate polymers possess sufficient molecular weight, mechanical properties, melt strength, and crystallinity to facilitate polymer processing.

In contrast, the reactive carriers according to the present invention have molecular weights that are less than about 10,000 g/mol. The molecular weight of the reactive carrier is typically less than 6000 g/mol, preferably less than 4000 g/mol, more preferably between about 300 and 2000 g/mol, and most preferably between about 400 and 1000 g/mol. As used herein, molecular weight refers to number-average molecular weight, rather than weight-average molecular weight.

In general, reactive carriers having carboxyl, hydroxyl, or amine functional groups are favored. Preferred are polyols, especially polyester polyols and polyether polyols, having a molecular weight that is sufficiently high such that the polyol will not substantially reduce the intrinsic viscosity (i.e., average molecular weight) of the polyethylene terephthalate polymer, and a viscosity that facilitates pumping of the polyol. Polyethylene glycol is a preferred polyol. Other exemplary polyols include functional polyethers, such as polypropylene glycol that is prepared from propylene oxide, random and block copolymers of ethylene oxide and propylene oxide, and polytetramethylene glycol that is derived from the polymerization of tetrahydrofuran.

Alternatively, the reactive carrier may include dimer or trimer acids and anhydrides. In another embodiment, the reactive carrier may possess, in addition to or in place of terminal functional groups, internal functional groups (e.g., esters, amides, and anhydrides) that react with the polyethylene terephthalate polymers. In yet another embodiment, the reactive carrier may include esters without terminal functional groups, amides without terminal functional groups, or anhydrides without terminal functional groups that are capable of reacting into the polyethylene terephthalate polymers during solid state polymerization and that will not cause the polyethylene terephthalate polymers to suffer intrinsic viscosity loss during injection molding processes.

It should be recognized that additives are sometimes marketed with oligomers that constitute an acceptable reactive carrier. For example, TINUVIN® 213, which is available from Ciba Specialty Chemicals, includes a hydroxyphenyl benzotriazole ultraviolet light absorber in a solution of unreacted polyethylene glycol having a molecular weight of 300 g/mol. As discussed previously, polyethylene glycol is a preferred reactive carrier. Accordingly, the present invention embraces the use of such premixed, additive/reactive carrier products.

An exemplary method according to the present invention includes reacting terephthalic acid and ethylene glycol in a heated esterification reaction to form monomers and oligomers of terephthalic acid and ethylene glycol, then polymerizing these monomers and oligomers via melt phase polycondensation to form polyethylene terephthalate polymers. The polyethylene terephthalate polymers are then formed into chips (or pellets via a polymer cutter) and solid state polymerized. Thereafter, an additive is introduced at an extruder into the polyethylene terephthalate polymers using a reactive carrier, which facilitates uniform blending within the polymer melt.

Preferably, the reactive carrier is a polyol (e.g., polyethylene glycol) having a molecular weight that permits the polyol to be pumped at near ambient temperatures (i.e., less than 60° C.) and that is introduced to the polyethylene terephthalate polymers in quantities such that bulk properties of the polyethylene terephthalate polymers are not significantly affected. Importantly, the polyol reactive carrier combines with the polyethylene terephthalate polymer such that it is non-extractable during subsequent processing operations (e.g., forming polyester beverage containers).

As noted, the invention embraces the late addition of various kinds of additives via the reactive carrier. Late addition is especially desirable where the additives are volatile or subject to thermal degradation. Conventional additive injection during the esterification stage or early during the polycondensation stage subjects additives to several hours of high-temperature (greater than 260° C.) and reduced-pressure (less than 10 torr) conditions. Consequently, additives that have significant vapor pressure at these conditions will be lost from the process. Advantageously, the method of the present invention significantly reduces the time additives are exposed to high polycondensation temperatures.

Additives according to the present invention can include preform heat-up rate enhancers, friction-reducing additives, stabilizers, inert particulate additives (e.g., clays or silicas), colorants, antioxidants, branching agents, oxygen barrier agents, carbon dioxide barrier agents, oxygen scavengers, flame retardants, crystallization control agents, acetaldehyde reducing agents, impact modifiers, catalyst deactivators, melt strength enhancers, anti-static agents, lubricants, chain extenders, nucleating agents, solvents, fillers, and plasticizers.

In a preferred embodiment, the additive is an ultraviolet (UV) radiation absorber. As is understood by those familiar with polyester packaging, UV absorbers protect the polyethylene terephthalate polymers and contents of packages from UV degradation.

In another preferred embodiment, the additive is an inert particulate additive, preferably either talc (i.e., a natural hydrous magnesium silicate of representative formula $3MgO.4SiO_2.H_2O$) or precipitated calcium carbonate. The inert particulate additive is introduced in low concentrations (i.e., about 20 and 200 ppm based on the combined weight of the polyethylene terephthalate polymers, the reactive carrier, and the inert particulate additive) to ensure that bottles formed from the polyethylene terephthalate polymers possess reduced frictional characteristics. Moreover, the inert particulate additive, which is preferably surface-treated to minimize haze formation in bottles, preferably has an average particle size of less than about ten microns, more preferably less than two microns. As described in commonly-assigned, copending U.S. Ser. No. 09/738,619, bottles formed from such polyethylene terephthalate polymers have improved frictional characteristics that reduce, and can eliminate, the need to apply, during filling operations, external lubricants to polyester bottles.

As will be known by those having skill in the art, polymerization catalysts increase polymerization rates, and thus productivity. Unfortunately, these same catalysts will eventually degrade the thermal stability of the polymer resin. Thus, in yet another embodiment, the additive carried by the reactive carrier is a catalyst stabilizer—more typically, extra catalyst stabilizer. In this regard, while phosphorous-containing stabilizers are preferred, any stabilizer that will deactivate the polymerization catalyst may be introduced via a reactive carrier. In general, the stabilizer should be non-reactive with the polymer and possess low residual moisture.

U.S. parent application Ser. No. 09/738,150 explains that as the polycondensation reaction nears completion, the catalyst begins to form acetaldehyde and cause discoloration or yellowing of the polyethylene terephthalate. Accordingly, as discussed herein, thermally stable polyester refers to polyester having low acetaldehyde content, low discoloration, and high retention of molecular weight despite exposure to high temperatures.

Acetaldehyde is an objectionable byproduct of polymer degradation. This is of particular concern to the food and beverage industry because acetaldehyde, even in minute amounts, adversely affects product taste. Moreover, polymer degradation will typically cause undesirable discoloration or yellowing. This is why a stabilizer, preferably containing phosphorous, is added to the polymer melt.

Advantageously, the late addition of the stabilizer to the polymer melt and then again at an extruder prevents the stabilizer from inhibiting ("cooling") the polymerization catalyst during the polycondensation reaction. This increases the production efficiency of the continuous polyethylene terephthalate process. Furthermore, because the stabilizer is added before polymer processing, the stabilizer can adequately prevent discoloration and degradation of the polyethylene terephthalate polyester.

Finally, it should be noted that because the melting and extruding steps in the formation of the polyethylene terephthalate polyester are performed at elevated temperatures (e.g., usually greater than 260° C.), it is important that the polyethylene terephthalate be thermally stable. Accordingly, the stabilizer additive must be adequately blended with the polymer melt to deactivate polymerization catalysts. The reactive carrier facilitates the incorporation of the stabilizer into the polymer resin.

Although the prior discussion may focus upon the continuous production of polyester terephthalate polymers, it will be understood that the invention is not so limited. The teachings disclosed herein may be applied to semi-continuous processes and even batch processes.

In the drawing and the specification, typical embodiments of the invention have been disclosed. Specific terms have been used only in a generic and descriptive sense, and not for purposes of limitation. The scope of the invention is set forth in the following claims.

That which is claimed is:

1. A method for introducing additives into polyethylene terephthalate, comprising combining at an extruder polyethylene terephthalate polymers and a reactive carrier having a molecular weight of less than about 10,000 g/mol, the reactive carrier being the delivery vehicle for one or more additives.

2. A method according to claim 1, wherein the polyethylene terephthalate polymers are a solid when combined with the reactive carrier at the extruder.

3. A method according to claim 1, wherein the reactive carrier is a liquid or slurry when combined with the polyethylene terephthalate polymers at the extruder.

4. A method according to claim 3, wherein the reactive carrier is at a near ambient temperature when combined with the polyethylene terephthalate polymers.

5. A method according to claim 1, wherein the reactive carrier is a solid when combined with the polyethylene terephthalate polymers at the extruder.

6. A method according to claim 1, wherein the step of combining at an extruder polyethylene terephthalate polymers and a reactive carrier comprises introducing into the extruder the polyethylene terephthalate polymers and the reactive carrier.

7. A method according to claim 1, wherein the step of combining at an extruder polyethylene terephthalate polymers and a reactive carrier comprises introducing the reactive carrier into the polyethylene terephthalate polymers before the extruder, and then mixing the polyethylene terephthalate polymers and the reactive carrier within the extruder.

8. A method according to claim 1, wherein the step of combining at an extruder polyethylene terephthalate polymers and a reactive carrier comprises introducing the reactive carrier into the polyethylene terephthalate polymers after the extruder.

9. A method according to claim 1, further comprising forming the polyethylene terephthalate polymers and the reactive carrier into containers.

10. A method according to claim 1, further comprising forming the polyethylene terephthalate polymers and the reactive carrier into films.

11. A method according to claim 1, further comprising spinning the polyethylene terephthalate polymers and the reactive carrier into polyester fibers.

12. A method according to claim 1, wherein the reactive carrier is combined with the polyethylene terephthalate polymers at the extruder in quantities such that its concentration in the polyethylene terephthalate polymers is less than about one weight percent.

13. A method according to claim 1, wherein the reactive carrier is combined with the polyethylene terephthalate polymers at the extruder in quantities such that its concentration in the polyethylene terephthalate polymers is less than about 1000 ppm.

14. A method according to claim 1, wherein the reactive carrier is combined with the polyethylene terephthalate polymers at the extruder in quantities such that its concentration in the polyethylene terephthalate polymers is less than 500 ppm.

15. A method according to claim 1, wherein the reactive carrier has a molecular weight of less than about 6000 g/mol.

16. A method according to claim 1, wherein the reactive carrier has a molecular weight of less than about 4000 g/mol.

17. A method according to claim 1, wherein the reactive carrier has a molecular weight of between about 300 and 2000 g/mol.

18. A method according to claim 1, wherein the reactive carrier has a molecular weight of between about 400 and 1000 g/mol.

19. A method according to claim 1, wherein the reactive carrier comprises a polyol having a molecular weight of less than about 6000 g/mol.

20. A method according to claim 1, wherein the reactive carrier comprises polyethylene glycol having a molecular weight of between about 300 and 2000 g/mol.

21. A method according to claim 1, wherein the reactive carrier comprises polyethylene glycol having a molecular weight of between about 400 and 1000 g/mol.

22. A method according to claim 1, wherein the reactive carrier is selected from the group consisting of dimer acids, dimer anhydrides, trimer acids, and trimer anhydrides.

23. A method according to claim 1, wherein the reactive carrier is selected from the group consisting of esters, amides, and anhydrides.

24. A method according to claim 1, wherein the one or more additives comprise a UV absorber.

25. A method according to claim 1, wherein the one or more additives comprise an additive that increases preform heat-up rate.

26. A method according to claim 1, wherein the one or more additives comprise a phosphorous-containing stabilizer.

27. A method according to claim 1, wherein the one or more additives comprise an oxygen scavenger.

28. A method according to claim 1, wherein the one or more additives comprise between about 20 and 200 ppm of an inert particulate additive selected from the group consisting of talc and calcium carbonate, the inert particulate additive having an average particle size of less than about ten microns.

29. A method according to claim 28, wherein the inert particulate additive is surface-modified.

30. A method according to claim 1, wherein the one or more additives include an additive selected from the group consisting of friction-reducing additives, stabilizers, inert particulate additives, colorants, antioxidants, branching agents, barrier agents, flame retardants, crystallization control agents, acetaldehyde reducing agents, impact modifiers, catalyst deactivators, melt strength enhancers, anti-static agents, lubricants, chain extenders, nucleating agents, solvents, fillers, and plasticizers.

31. A method for introducing additives into polyethylene terephthalate, comprising introducing to an extruder polyethylene terephthalate polymers and a reactive carrier, wherein:

the reactive carrier is the delivery vehicle for one or more additives;

the reactive carrier has an average molecular weight of less than about 10,000 g/mol; and the reactive carrier is introduced to the extruder in quantities such that its concentration in the polyethylene terephthalate polymers is less than about one weight percent.

32. A method according to claim 31, wherein the polyethylene terephthalate polymers are introduced to the extruder as a solid.

33. A method according to claim 31, wherein the reactive carrier is introduced to the extruder as a liquid or slurry.

34. A method according to claim 31, wherein the reactive carrier is introduced to the extruder as a solid.

35. A method according to claim 31, wherein the reactive carrier is introduced to the extruder in quantities such that its concentration in the polyethylene terephthalate polymers is less than about 1000 ppm.

36. A method according to claim 31, wherein the reactive carrier has a molecular weight of less than about 6000 g/mol.

37. A method according to claim 31, wherein the reactive carrier has a molecular weight of less than about 4000 g/mol.

38. A method according to claim 31, wherein the reactive carrier has a molecular weight of between about 300 and 2000 g/mol.

39. A method according to claim 31, wherein the reactive carrier has a molecular weight of between about 400 and 1000 g/mol.

40. A method for introducing additives into polyethylene terephthalate, comprising:

reacting a terephthalate component and a diol component to form polyethylene terephthalate precursors;

polymerizing the polyethylene terephthalate precursors via melt phase polycondensation to form polymers of polyethylene terephthalate; and thereafter introducing to an extruder the polyethylene terephthalate polymers and a reactive carrier having a molecular weight of less than about 10,000 g/mol, the reactive carrier being the delivery vehicle for one or more additives.

41. A method according to claim 40, further comprising pelletizing the polyethylene terephthalate polymers prior to the step of introducing the reactive carrier.

42. A method according to claim 40, further comprising solid state polymerizing the polyethylene terephthalate polymers prior to the step of introducing the reactive carrier.

43. A method according to claim 40, further comprising solid state polymerizing the polyethylene terephthalate polymers and the reactive carrier.

44. A method according to claim 40, further comprising forming the polyethylene terephthalate polymers and the reactive carrier into containers.

45. A method according to claim 40, further comprising forming the polyethylene terephthalate polymers and the reactive carrier into films.

46. A method according to claim 40, further comprising spinning the polyethylene terephthalate polymers and the reactive carrier into polyester fibers.

47. A method according to claim 40, wherein the step of reacting a terephthalate component and a diol component comprises:

reacting terephthalic acid and ethylene glycol in a heated esterification reaction to form monomers and oligomers of terephthalic acid and ethylene glycol, as well as water; and removing water as it is formed during the esterification reaction to enable the esterification reaction to go essentially to completion.

48. A method according to claim 40, wherein the step of reacting a terephthalate component and a diol component comprises:

reacting dimethyl terephthalate and ethylene glycol in a heated ester exchange reaction to form monomers and oligomers of terephthalate and ethylene glycol, as well as methanol; and removing methanol as it is formed during the ester exchange reaction to enable the ester exchange reaction to go essentially to completion.

49. A method according to claim 40, wherein the reactive carrier is a liquid or slurry.

50. A method according to claim 40, wherein the reactive carrier is a solid.

51. A method according to claim 40, wherein the reactive carrier is introduced to the extruder in quantities such that its concentration in the polyethylene terephthalate polymers is less than about one weight percent.

52. A method according to claim 40, wherein the reactive carrier is introduced to the extruder in quantities such that its concentration in the polyethylene terephthalate polymers is less than about 1000 ppm.

53. A method according to claim 40, wherein the reactive carrier has a molecular weight of less than about 6000 g/mol.

54. A method according to claim 40, wherein the reactive carrier has a molecular weight of between about 300 and 2000 g/mol.

55. A method according to claim 40, wherein the reactive carrier comprises a polyol having a molecular weight of less than about 4000 g/mol.

56. A method according to claim 40, wherein the reactive carrier is selected from the group consisting of dimer acids, dimer anhydrides, trimer acids, and trimer anhydrides.

57. A method according to claim 40, wherein the reactive carrier is selected from the group consisting of esters, amides, and anhydrides.

58. A method according to claim 40, wherein the one or more additives include an additive selected from the group consisting of UV absorbers, heat-up rate enhancers, friction-reducing additives, stabilizers, inert particulate additives, colorants, antioxidants, branching agents, barrier agents, oxygen scavengers, flame retardants, crystallization control agents, acetaldehyde reducing agents, impact modifiers, catalyst deactivators, melt strength enhancers, anti-static agents, lubricants, chain extenders, nucleating agents, solvents, fillers, and plasticizers.

* * * * *

UNITED STATES PATENT AND TRADEMARK OFFICE
CERTIFICATE OF CORRECTION

PATENT NO. : 6,569,991 B2
DATED : May 27, 2003
INVENTOR(S) : Nichols et al.

It is certified that error appears in the above-identified patent and that said Letters Patent is hereby corrected as shown below:

<u>Title page,</u>
Item [56], References Cited, U.S. PATENT DOCUMENTS,
"2002/0128427 A1", "Schaat" should read -- Schaaf --.
FOREIGN PATENT DOCUMENTS,
"EP 0 466 370 A2","0 466 370" should read -- 0 455 370 --.

Signed and Sealed this

Twenty-third Day of December, 2003

JAMES E. ROGAN
*Director of the United States Patent and Trademark Office*